(No Model.)  3 Sheets—Sheet 1.

P. E. DOOLITTLE.
BRAKE MECHANISM FOR BICYCLES.

No. 576,560. Patented Feb. 9, 1897.

Witnesses
Jas. H. Blackwood
H. P. Doolittle

Inventor
Perry E. Doolittle
by W. H. Doolittle & Son
Attorneys (No Model.) 3 Sheets—Sheet 2.
P. E. DOOLITTLE.
BRAKE MECHANISM FOR BICYCLES.

No. 576,560. Patented Feb. 9, 1897.

Witnesses
Jos. H. Blackwood
H. P. Doolittle

Inventor
Perry E. Doolittle
by M. Doolittle Son
Attorneys (No Model.) 3 Sheets—Sheet 3.

P. E. DOOLITTLE.
BRAKE MECHANISM FOR BICYCLES.

No. 576,560. Patented Feb. 9, 1897.

Witnesses
Jos. H. Blackwood
H. P. Doolittle

Inventor
Perry E. Doolittle
by W. H. Doolittle & Son
Attorneys

UNITED STATES PATENT OFFICE.

PERRY ERNEST DOOLITTLE, OF TORONTO, CANADA.

BRAKE MECHANISM FOR BICYCLES.

SPECIFICATION forming part of Letters Patent No. 576,560, dated February 9, 1897.

Application filed April 24, 1896. Serial No. 588,912. (No model.) Patented in Belgium May 28, 1896, No. 121,804.

*To all whom it may concern:*

Be it known that I, PERRY ERNEST DOOLITTLE, a citizen of Great Britain, residing at Toronto, in the Province of Ontario, Dominion of Canada, have invented certain new and useful Improvements in Brake Mechanisms for Bicycles and Similar Vehicles, (for which I have obtained Letters Patent of Belgium, dated May 28, 1896, No. 121,804;) and I do hereby declare the following to be a full, clear, and exact description of the invention, such as will enable others skilled in the art to which it appertains to make and use the same.

My invention relates to brake mechanism for bicycles and similar vehicles in which the driving means are employed to propel as well as to reverse the movement of the vehicle.

The object of my invention is to provide the driving means with a fixed brake, whereby the reversing action of the driving means will directly operate the brake to retard to a greater or less degree the forward movement of the vehicle, according to the amount of pressure applied to the driving means.

To this end my invention consists of the means as hereinafter described and claimed.

The invention is illustrated in the accompanying drawings, in which—

Figure 1:
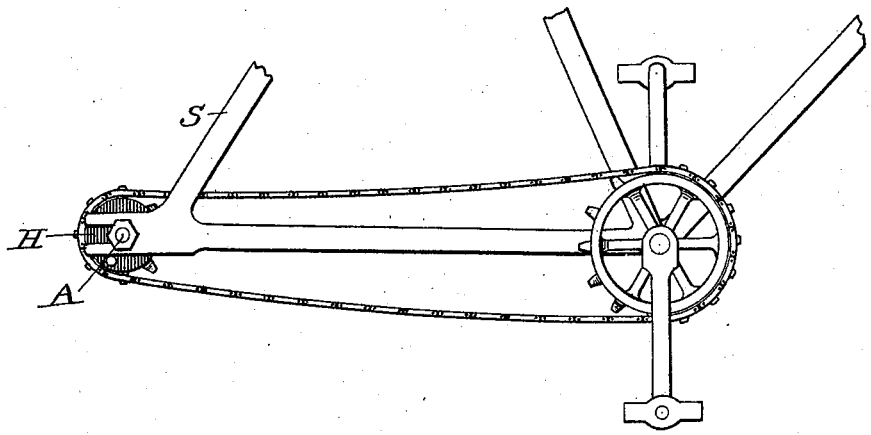
Figure 6:
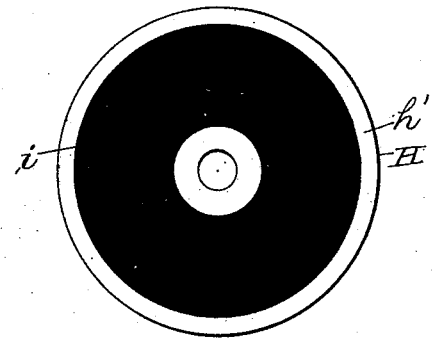
Figure 7:
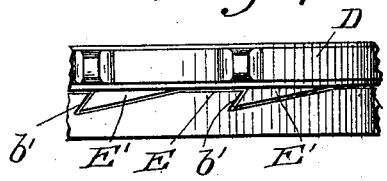
Figure 2:
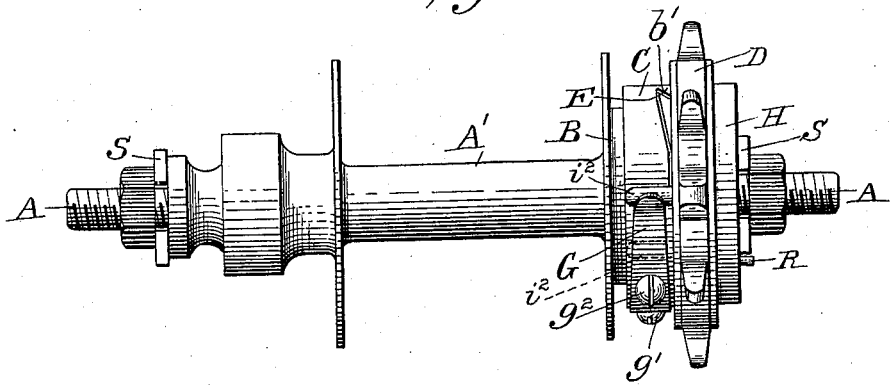
Figure 3:
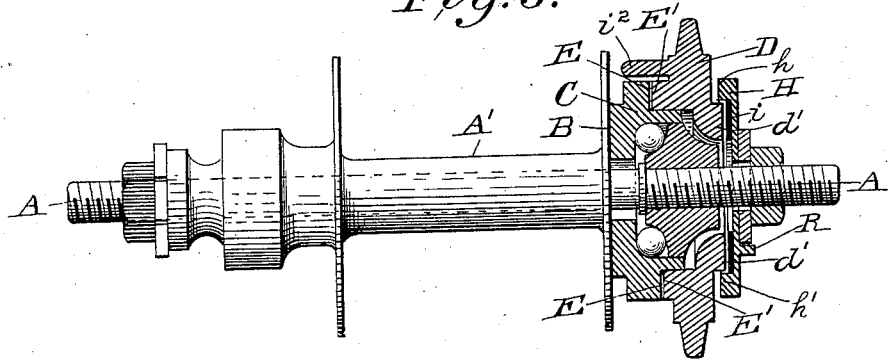
Figure 4:
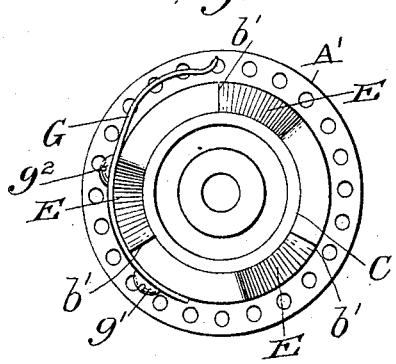
Figure 5:
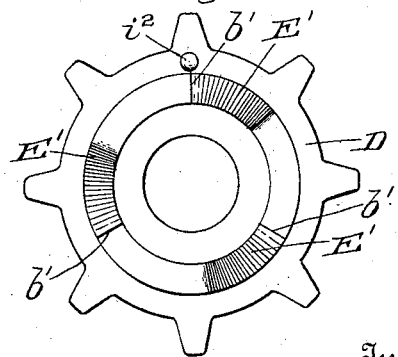
Figure 8:
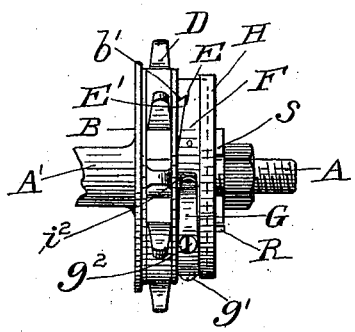
Figure 9:
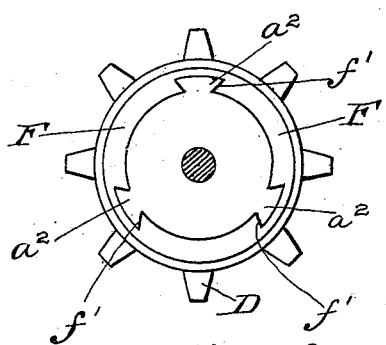
Figure 10:
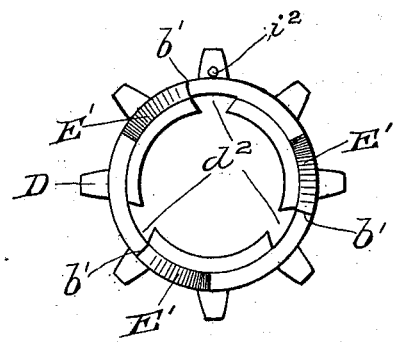

Figure 1 is a side view in elevation of a pedal-shaft, chain, and sprocket-wheel with my invention attached; Fig. 2, a plan of the axle and hub of the driving-wheel with sprocket-and-brake mechanism; Fig. 3, a view in elevation, partly in vertical section, of matters in Fig. 2; Fig. 4, a face view of an inner brake-collar; Fig. 5, an inner face view of the sprocket-disk; Fig. 6, an inner face view of the friction-disk; and Fig. 7, a detail edge view broken away, showing the formation of the shouldered and inclined teeth forming the brake-clutch; Fig. 8, a view similar to Fig. 2 of a modification; Fig. 9, an end view of hub and brake-disk in the modification with friction-disk removed, and Fig. 10 an outer face view of the modified form of sprocket-wheel.

My invention is here illustrated and described as applied to a bicycle of the ordinary form, employing a sprocket and sprocket-chain as the driving means operated from the pedal-shaft.

Referring to the drawings, A A' are the spindle and hub, respectively, of a rear driving-wheel, and B is the sprocket end of the hub. Mounted on the hub is a brake-collar C and a sprocket-wheel D. The collar C is rigidly secured to the hub; but the sprocket D is so mounted thereon as to permit it to be given, in addition to its forward rotation with the hub, a slight backward rotary movement on the hub and also a lateral sliding movement thereon. The collar C is provided on its inner face with raised teeth or sections E in the form of inclines, the highest part of which terminate in abrupt inwardly-beveled shoulders $b'$. The sprocket D on its inner face is provided with similar teeth E' and shoulders. These respective teeth or sections together form a clutch, and when set together the shoulders $b'$ of the respective teeth engage, their inner beveled faces meeting, and the inclined faces of the teeth are in close and continuous contact, so that in their locked position the thinnest portions of the collar rest against the thickest portions of the sprocket-wheel.

H is a disk-plate having an inwardly-extending annular rim $h'$ and rigidly mounted on the spindle A, so as to be secured against rotation around the spindle; but said disk is at the same time readily removable from the spindle when the latter is disengaged from the frame. Within the rim $h'$ the face of the plate is provided with a frictional surface $i$, which may be composed of leather, rubber, or other suitable frictional material. The outer plain face $d'$ of the sprocket-wheel acts as a friction-plate and is adapted to enter within the rim $h'$ of disk H and impinge against said disk, as hereinafter described.

The rim $h'$ of the disk H, extending over the outer peripheral edge of the sprocket-wheel, keeps the frictional surface of the disk free from all foreign matter that would tend to obstruct its operation and also serves to exclude dust and dirt from the other parts of the brake-and-clutch mechanism.

R is a pin or lug on the outer face of the disk H to contact with the forked frame S for the purpose of preventing the disk from turning with the sprocket when the brake-pressure is applied.

G is a spring-arm secured on the edge of the collar C at one end by means of two screws $g'$ $g^2$, while the free end of said spring bears against a pin $i^2$, projecting from the inner face of the sprocket. The said pin holds the spring-arm up from the collar, and the united function of the pin and spring is to lock the sprocket-wheel in firm engagement with the collar, as hereinafter described. The spring-arm is provided with the extra screw $g^2$, arranged in front of the screw $g'$, by which the pressure of the spring-arm upon the pin and sprocket is adjusted and by which more or less back pressure of the driving means will be necessary to operate the clutch and control the extent of the braking operation, or the spring-arm may be screwed down thereby so tightly as to prevent the operation of the brake altogether.

The operation of the device is as follows: In the act of back-pedaling or reversing the movement of the wheel to check its forward direction the power exerted on the sprocket tends to turn it slightly backward on the hub. This reverse action causes the engaging sections of the respective faces of collar and sprocket to ride upon each other and forces the sprocket in against the face of the friction-disk H. The pressure of the sprocket-wheel against the disk increases as the inclines rise upon each other. The same backward movement of the sprocket overcomes the resistance of the spring-arm and the pin on the sprocket is forced under the end of the arm, but as the sprocket and pin are turned backward the pressure of the spring increases, and when the backward pressure is relieved from the sprocket the action of the spring is such as to still hold the sprocket against the friction-plate H until released by a forward pressure of the driving means, which carries the sprocket beyond the holding force of the spring. When the collar and sprocket are locked together in their normal condition, the pressure of the spring against the sprocket-pin holds them in this position until the reverse pressure of the driving means is again exerted to overcome it.

It will be seen that the same brake action of the two disks carrying the engaging inclined teeth may be accomplished, whatever may be the means of reversing the movable disk and whether the same is a sprocket-disk or not, whenever such action is sufficient to force the inclined teeth upon each other, the amount of friction produced being controlled by the amount of back pressure exerted. When used with an ordinary bicycle, after being locked by the spring the brake is held so without increasing or continuing the backward pressure and the brake is released by a simple forward thrust of the pedal, which will carry the sprocket-wheel forward and force the inclined engaging teeth in the opposite directions, separating the disks. When not in use, the beveled shoulders of the teeth will hold the sprocket-wheel tightly against the collar, the spring-arm retaining it in that position.

Instead of making the brake-surface $d'$ of the sprocket-wheel integral therewith, it may be made separate therefrom and form a separate disk on the same hub and revolve therewith and be driven laterally against the friction-plate by the back motion of the sprocket. In such case the collar C is dispensed with. The teeth E' of the sprocket are shifted to its opposite side, as well as the pin $i^2$, and the said separate disk is provided with the engaging teeth E and spring G. In such case the said separate disk is driven laterally on the hub and not the sprocket. In this modification, as shown in the drawings, Figs. 8, 9, and 10, the separate disk is indicated by F. The sprocket end of the hub B is provided on its periphery with projections or lugs $a^2$ and the sprocket D with recesses $d^2$ on its inner circumference. When the sprocket is slid onto the hub, the projections $a^2$ of the latter enter the recesses $d^2$. The sprocket is then pushed against the rim $a^3$ of the hub and turned so as to bring the recesses $d^2$ out of engagement with the projections or lugs $a^2$, whereby the sprocket is held against lateral movement on the hub by said lugs. The disk F is provided with recesses $f'$, which, when this disk is placed on the hub, engage with the lugs $a^2$. The disk F is by this engagement made to rotate with the hub, but is also at the same time permitted a lateral movement thereon.

It will be seen that the action of the brake is entirely automatic, being controlled by and corresponding to the pressure exerted by the rider in checking the forward movement of the wheel in back-pedaling.

The parts of the brake are made to fit closely together, so that dust and dirt are excluded.

Having thus described my invention, what I claim is—

1. In a bicycle or other vehicle in combination with the driving-wheel and driving means, a friction-disk mounted on the axis of said wheel, a second disk mounted on a support adjacent to said friction-disk and connected with the driving means, means to force said second disk against the friction-disk to retard the forward movement of the vehicle, and locking means to normally prevent the engagement of said disks and to lock them when so engaged, substantially as described.

2. In a bicycle or similar vehicle, in combination with the driving-wheel and driving means, a disk to which the driving means are applied mounted on the hub of said driving-wheel and having a lateral movement thereon, a clutch also mounted on said hub and engaging with said disk, and a removable disk on the axis of said driving-wheel and secured against rotation thereon, said removable disk provided with an inner frictional surface and an annular rim inclosing the peripheral edge of said first disk, substantially as and for the purpose described.

3. In combination with the driving mechanism, a brake mechanism consisting of a sprocket-wheel having a limited rotary and lateral movement on its support, a collar rigidly mounted on said hub, said sprocket and collar provided with inclined projecting sections on their adjacent faces, a friction-plate adjacent to said sprocket, a spring-arm secured to said collar, a pin projecting from said sprocket with which said spring engages, said driving means connected with said sprocket, whereby when the sprocket is forced against said friction-plate the said spring-arm holds the sprocket against said friction-plate until released by a forward pressure of the driving means, substantially as described.

4. In a bicycle or other similar vehicle in combination with the driving means, a friction-disk, a support for said disk, means to force the driving means into engagement with said friction-disk on the reverse movement of the driving means, and a spring-lock on said vehicle adjacent to said driving means and adapted to normally prevent the engagement of said disk and driving means and to lock them when so engaged, substantially as described.

In testimony whereof I affix my signature in presence of two witnesses.

PERRY ERNEST DOOLITTLE.

Witnesses:
JAS. H. BLACKWOOD,
H. P. DOOLITTLE.